United States Patent
Löser et al.

(10) Patent No.: US 10,266,374 B2
(45) Date of Patent: Apr. 23, 2019

(54) LIFT INSTALLATION HAVING A COMPENSATING DEVICE, SO THAT A FIRST ROLLER IS LARGELY RELIEVED OF LOADING WHEN THE LIFT CAR IS AT REST

(71) Applicants: ThyssenKrupp Elevator AG, Essen (DE); ThyssenKrupp AG, Essen (DE)

(72) Inventors: Friedrich Löser, Riemerling (DE); Markus Jetter, Filderstadt (DE)

(73) Assignees: thyssenkrupp Elevator AG, Essen (DE); thyssenkrupp AG, Essen (DE)

( * ) Notice: Subject to any disclaimer, the term of this patent is extended or adjusted under 35 U.S.C. 154(b) by 0 days.

(21) Appl. No.: 15/527,978

(22) PCT Filed: Oct. 22, 2015

(86) PCT No.: PCT/EP2015/074459
§ 371 (c)(1),
(2) Date: May 18, 2017

(87) PCT Pub. No.: WO2016/083032
PCT Pub. Date: Jun. 2, 2016

(65) Prior Publication Data
US 2017/0327346 A1 Nov. 16, 2017

(30) Foreign Application Priority Data
Nov. 25, 2014 (DE) .......................... 10 2014 017 357

(51) Int. Cl.
*B66B 7/04* (2006.01)
*B60P 1/44* (2006.01)
(Continued)

(52) U.S. Cl.
CPC ............ *B66B 7/046* (2013.01); *B60P 1/4421* (2013.01); *B66B 7/042* (2013.01); *B66B 19/002* (2013.01);
(Continued)

(58) Field of Classification Search
CPC ....... B66B 7/046; B66B 7/042; B66B 19/002; B60P 1/4421
See application file for complete search history.

(56) References Cited

U.S. PATENT DOCUMENTS 5,020,639 A * 6/1991 Michel .................. B66B 1/3484
 187/346
5,531,294 A * 7/1996 Burton ...................... B66B 1/28
 187/292
(Continued)

FOREIGN PATENT DOCUMENTS

CN 1279208 A 1/2001
EP 1818305 A1 8/2007
(Continued)

OTHER PUBLICATIONS

International Search Report for International Application No. PCT/EP2015/074459 dated Dec. 4, 2015, 2 pages.
(Continued)

*Primary Examiner* — Michael A Riegelman
(74) *Attorney, Agent, or Firm* — RMCK Law Group PLC (57) ABSTRACT

The disclosure relates to a lift installation having a lift car which can be moved along a guide rail. The lift installation here comprises at least a first pair of rollers and a second pair of rollers. The guide rail runs between the two rollers of the first pair of rollers and between the two rollers of the second pair of rollers. The lift installation also has an apparatus for subjecting the lift car to a retaining force, wherein there is a horizontal offset between the point at which the retaining
(Continued)

force takes effect and the center of gravity of the lift car, and therefore the lift car is subjected to a first torque.

20 Claims, 4 Drawing Sheets

(51) Int. Cl.
    *B66B 19/00*     (2006.01)
    *B66B 7/12*     (2006.01)
    *B66B 11/02*     (2006.01)
    *B66B 11/04*     (2006.01)
    *G01B 5/00*     (2006.01)

(52) U.S. Cl.
    CPC ......... *B66B 7/1246* (2013.01); *B66B 11/0206* (2013.01); *B66B 11/0407* (2013.01); *G01B 5/0018* (2013.01)

(56) References Cited

U.S. PATENT DOCUMENTS

| | | | |
|---|---|---|---|
| 6,357,554 B1* | 3/2002 | Valk | B66B 1/3484 187/292 |
| 2002/0179377 A1* | 12/2002 | Higaki | B66B 7/044 187/292 |
| 2003/0192745 A1* | 10/2003 | Utsunomiya | B66B 7/042 187/292 |
| 2005/0241886 A1* | 11/2005 | Marti | B66B 5/18 187/351 |
| 2007/0199770 A1 | 8/2007 | Kocher | |
| 2009/0308697 A1* | 12/2009 | Boschin | B66B 7/042 187/409 |
| 2012/0004777 A1* | 1/2012 | Wang | B66B 7/042 700/280 |
| 2013/0220738 A1* | 8/2013 | Kalliomaki | B66B 11/0206 187/251 |
| 2013/0304262 A1* | 11/2013 | Wang | B66B 7/042 700/280 |
| 2014/0246274 A1 | 9/2014 | Ach | |
| 2015/0128403 A1* | 5/2015 | Valkama | B66B 5/0087 29/464 |
| 2016/0068369 A1* | 3/2016 | Valkama | B66B 5/0087 33/645 |
| 2016/0137458 A1* | 5/2016 | Godwin | B66B 7/042 187/250 |
| 2016/0272465 A1* | 9/2016 | Nakano | B66B 7/042 |
| 2017/0305719 A1* | 10/2017 | Jetter | B66B 7/1246 |
| 2017/0355563 A1* | 12/2017 | Zimmerli | B66B 17/34 |

FOREIGN PATENT DOCUMENTS

| | | |
|---|---|---|
| EP | 1772413 B1 | 12/2010 |
| JP | 5574981 A | 6/1980 |
| JP | 5628178 A | 3/1981 |
| JP | 61226485 | 10/1986 |
| JP | H09194163 A | 7/1997 |
| JP | 2005138912 A | 6/2005 |
| WO | 2010072643 A1 | 7/2010 |

OTHER PUBLICATIONS

Chinese Office Action for CN Application No. 201580062432.8 dated Jul. 5, 2018, 9 pages.

* cited by examiner

LIFT INSTALLATION HAVING A COMPENSATING DEVICE, SO THAT A FIRST ROLLER IS LARGELY RELIEVED OF LOADING WHEN THE LIFT CAR IS AT REST

CROSS-REFERENCE TO RELATED APPLICATIONS

This application is a 371 U.S. National Stage of International Application No. PCT/EP2015/074459, filed Oct. 22, 2015, which claims priority to German Application No. 10 2014 017 357.7filed on Nov. 25, 2014. The disclosure of each of the above applications is incorporated herein by reference in their entirety.

FIELD

The present disclosure relates to a lift installation with an off-center apparatus for holding the lift car.

BACKGROUND

Lift installations are known for example from EP 1 772 413 and EP 1 818 305. With an off-center apparatus for holding the lift car, the retaining force is not applied centrally to the lift car. This means that the retaining force is applied neither along a center of gravity line (a vertical line containing the center of gravity) nor at the geometrical center or along a corresponding vertical line.

SUMMARY

The lift installations in this case comprise a lift car which can move along a guide rail with at least a first pair of rollers and a second pair of rollers. Here the guide rail runs between the two rollers of the first pair of rollers and between the two rollers of the second pair of rollers. Moreover, the lift installation has an apparatus for subjecting the lift car to a retaining force. In this way, the lift car can be held in a position of rest in order to allow passengers to get on and off. Alternatively, the position of rest can also be a parked position.

In lift installations with an off-center suspension, the apparatus can comprise a supporting rope and a traction sheave, the supporting rope connecting the lift car across the traction sheave to a counterweight. Alternatively, the apparatus for holding the lift car can also be designed as a linear motor. In another variant, the apparatus can also be designed as a parking brake.

With an off-center suspension of the lift car, a horizontal offset exists between the point at which the retaining force takes effect and the center of gravity of the lift car. This means that a first torque is acting on the lift car. The first torque would result in a tilting of the lift car.

It is known to transmit compensating forces from the guide rail across the rollers to the lift car. However, this results in a heavy loading of the rollers. This is explained at length with reference to FIGS. 3 and 4. During the motion of the lift car, the entire running surface of the rollers is subjected to this loading. When the lift car is at rest (e.g., during a stop or in a nighttime parking position), on the other hand, the loading acts for a rather lengthy time on a stationary contact region between roller and guide rail. This leads to a plastic deformation of the rollers, especially if the latter have a soft, cushioning material on the running surface. For this reason, corresponding lift installations with an off-center holding apparatus have been used thus far only for the area of low-to mid-rise applications at up to medium speeds. In these applications, on the one hand the payload is smaller, so that a smaller loading is transmitted across the rollers, and on the other hand a harder roller material can be used. The harder the roller material, the less the plastic deformation due to the loading of the rollers when standing still. But at high speeds, a harder roller material results in a distinct noise production. Furthermore, the slight cushioning of the harder roller material results in an uncomfortable ride, since relatively many vibrations are transmitted to the lift car. However, a soft roller material with good cushioning is subject to greater plastic deformations, which in turn lead to a strong noise production and an uncomfortable ride. Therefore, rollers with a soft roller material either can only be used with low payloads or the rollers need to be replaced correspondingly frequently.

The problem which the present invention proposes to solve is to overcome these drawbacks.

This problem is solved in that the lift car has at least a first compensating device so that, when the lift car is at rest, the guide rail is subjected to sufficient force to give rise to a second torque, which largely compensates for the first torque, so that a first roller of the first pair of rollers is largely relieved of loading when the lift car is at rest.

Because the compensating force at standstill is now transmitted no longer across the first roller, but rather across the compensating device, the plastic deformations can be greatly reduced despite the use of soft roller material.

By a roller being largely relieved of loading by a compensating device is meant in the sense of this application that the force which is transmitted across the roller to the guide rail is less than 20%, preferably less than 10%, of the force transmitted without use of the compensating device. Since the compensating device is used only when the lift car is at rest, this means that the force acting on the roller when the lift car is at rest is less than 20% of the force which acts on the roller when the lift car is moved.

By largely compensating for the first torque by a second torque is meant in the sense of this application that the absolute magnitude of the sum of the two torques is less than 20%, preferably less than 10%, of the absolute magnitude of the first torque.

In a further modified embodiment, the compensating device comprises at least one actuator. This can be, for example, a hydraulic or pneumatic actuator or an electromagnetic actuator. An actuator has the advantage that a mechanical shifting and thus a force transmittance can be provided with a simple electrical control signal.

In particular, the actuator has a predefined travel. By travel is meant the longitudinal extension of the actuator on account of the control signal. With a predefined travel, the design of the actuator stipulates that the actuator provides a fixed longitudinal extension. Unlike an adjustable actuator, in which the length of the travel can be selected by the control signal, the actuator with a predefined travel only has an activated and a deactivated state. Such actuators are low-cost and easy to operate, since no feedback control signal is required.

In a special variant of the lift installation, the first roller of the first pair of rollers is joined by an elastic connection element to a mounting and the actuator has a predefined travel which is adapted to the stiffness of the elastic connection element. Depending on the stiffness of the elastic connection element, the first torque when the lift car is at rest (and with the compensating device switched off) causes a more or less strong tilting of the lift car. Upon tilting of the lift car, the elastic connection element is compressed until the restoring force just produces a compensating torque. With high stiffness, the required restoring force is already reached after a short compression path, while with a low stiffness a longer path is required. Thanks to the actuator of the compensating device, the tilting of the lift car is canceled out, as made clear by means of FIGS. 4 and 5. For a larger tilting, a longer travel of the actuator is also required. Thus, the travel of the actuator depends on the stiffness of the elastic connection element. The adapting of the travel to the stiffness has the advantage that the adjustment only has to be done once (or, only during maintenance intervals). No costly inspection and regulating of the actuator during operation is needed.

In an alternative embodiment, the travel of the actuator is instead adjustable. This enables a flexible operation. Even with changes to the lift installation during its lifetime, the actuator can be optimally operated. Thus, for example, changes to the roller radius due to temperature or wear can be compensated with no problem.

In a further modified variant of the lift installation, the apparatus comprises a parking brake, in which the compensating device is integrated. In this way, the number of components can be reduced, since the task of the compensating device is also handled by the parking brake. No separate compensating device is required.

The parking brake in this case comprises in particular two brake shoes, which when the parking brake is active apply opposing pressing forces from opposite sides against the same vertical position on the guide rail. Here, the two brake shoes act with different pressing forces on the guide rail, so that the force remains as the resultant force of the two different pressing forces. In this way, a second torque is created with no additional components, which largely compensates for the first torque.

In order to make sure that the compensating force is transmitted substantially across the brake shoe of the parking brake and not across a roller, the lift installation is mechanically designed so that the first roller is connected by an elastic connection element to a mounting and a first brake shoe of the two brake shoes is arranged on the same side of the guide rail as the first roller. In this case, the first brake shoe is connected by an elastic element to a frame, the elastic element having greater stiffness than the elastic connection element. Thus, the force is transmitted substantially across the element with the greater stiffness and therefore across the first brake shoe and not the first roller.

In a further modified embodiment, the lift installation comprises controls, wherein the compensating device is in signal communication with the controls. Thus, at each stop, the lift controls can send a signal to the compensating device to perform the load relieving of the first roller. The signal communication can be realized for example by a cable connection or a radio connection.

A special variant of the lift installation is distinguished in that the lift car comprises a load-bearing frame and an interior car, wherein between the interior car and the load-bearing frame there is arranged at least one weight sensor for determining the weight of the lift car. Thus, by means of the weight sensor, the payload and therefore the value of the first torque can be determined. In particular, in this variant the first compensating device comprises a control unit, which stands in signal communication with the weight sensor and the compensating device in order to generate from the signal of the weight sensor a control signal for the compensating device. For example, in this variant the travel of the actuator is optimally adapted to the payload and thus to the value of the first torque.

In a further variant, the first roller comprises a sensor for determining the force transmitted across the first roller. In this way, it can be measured directly whether a successful load relieving of the first roller occurs. In addition to a pure checking, the sensor signal can also be used to regulate the force. For this, the first compensating device comprises a control unit, which stands in signal communication with the sensor in order to generate from the signal of the sensor a control signal for the compensating device. For example, the travel of the actuator is increased until the first roller is entirely relieved of loading.

In a further modified embodiment, the lift car comprises a second compensating device in order to apply a force to the guide rail when the lift car is at rest so that a second torque is produced, which largely compensates for the first torque, so that at least a first roller of the second pair of rollers is largely relieved of loading when the lift car is at rest. In this case, the first compensating device and the second compensating device have a vertical offset from each other. In particular, the two compensating devices are designed so that the forces which the compensating devices can apply to the guide rail are directed opposite each other.

The problem according to the invention is likewise solved by a method for operating a lift installation having a lift car which can be moved along a guide rail, comprising at least a first pair of rollers and a second pair of rollers. The guide rail runs between the two rollers of the first pair of rollers and between the two rollers of the second pair of rollers. Furthermore, the lift installation has an apparatus for subjecting the lift car to a retaining force, wherein there is a horizontal offset between the point at which the retaining force takes effect and the center of gravity of the lift car, and therefore the lift car is subjected to a first torque. When the lift car is at rest a first compensating device of the lift car applies a force to the guide rail to give rise a second torque, which compensates for the first torque, so that at least a first roller of the first pair of rollers is largely relieved of loading. The benefits of this method have been explained above in regard to the apparatus.

In addition, when the lift car is moving, the guide rail is no longer subjected to a force by the compensating device of the lift car, so that the forces compensating for the first torque are transmitted across the rollers of the first and second pair of rollers from the guide rail to the lift car.

BRIEF DESCRIPTION OF THE DRAWINGS

In the following, the invention shall be explained more closely with the aid of drawings. Specifically, there are shown.

DETAILED DESCRIPTION

Figure 1:
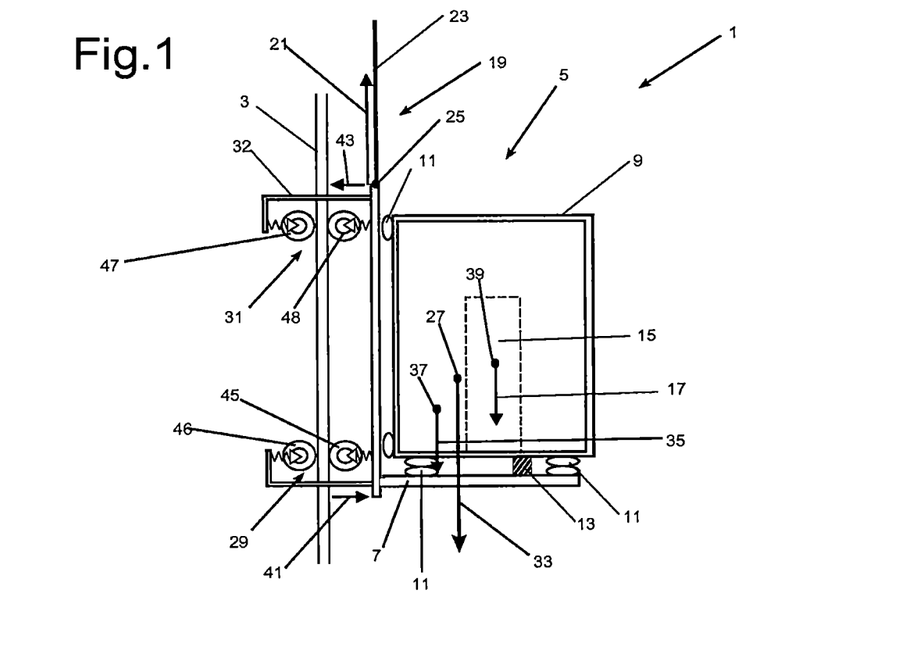
FIG. 1 a schematic view of a lift installation in the prior art

FIG. 1 shows a schematic representation of a lift installation 1. The lift installation 1 comprises a guide rail 3 and a lift car 5. The lift car 5 is arranged so that it can move along the guide rail 3. For this, the lift car 5 comprises a first pair of rollers 29 and a second pair of rollers 31, wherein the guide rail 3 runs between the two rollers of the first pair of rollers 29 and between the two rollers of the second pair of rollers 31. The two pairs of rollers 29 and 31 are arranged inside a roller housing 32.

Furthermore, the lift car 5 comprises a load-bearing frame 7, carrying an interior car 9. The weight 33 of the lift car 5 is composed of the weight 35 of the empty lift car 5 and the weight 17 of the payload. The weight 35 of the empty lift car 5 is applied at the center of gravity 37 of the empty lift car and the weight 17 of the payload 15 at the center of gravity 39 of the payload 15. The weight 33 of the loaded lift car 5, which is the sum of the weights 17 and 35, is applied at the center of gravity 27 of the loaded lift car 5.

Between interior car 9 and load-bearing frame 7 are arranged damping elements 11 and a weight sensor 13. With the weight sensor 13, the weight 17 of the payload 15 can be determined. Connected to the load-bearing frame 7 is an apparatus 19 which applies a retaining force 21 to the lift car. The apparatus 19 comprises a supporting rope 23, which connects the lift car 5 across a traction sheave to a counterweight.

Between the point 25 at which the retaining force 21 takes effect and the center of gravity 27 of the loaded lift car 5 there exists a horizontal offset, so that a first torque acts on the lift car. This offset is typical for lift installations with an off-center apparatus 19 for holding the lift car 5. In order to hold the lift car 5 in a stable position, the first torque must be compensated. For this, it is known how to transmit compensating forces 41 and 43 across a first roller 45 of the first pair of rollers 29 and a first roller 47 of the second pair of rollers 31 from the guide rail 3 to the lift car 5. This shall be explained below with the aid of FIGS. 3 and 4.

The lift installation 1 is designed as a so-called rucksack configuration. In this, guide rails are arranged only on one side of the lift car 5. Due to the representation, FIG. 1 shows only one guide rail 3. A second guide rail is arranged at an offset on the same side of the lift car 5. The lift car comprises appropriately designed third and fourth pairs of rollers, between which the second guide rail runs.

Figure 2:
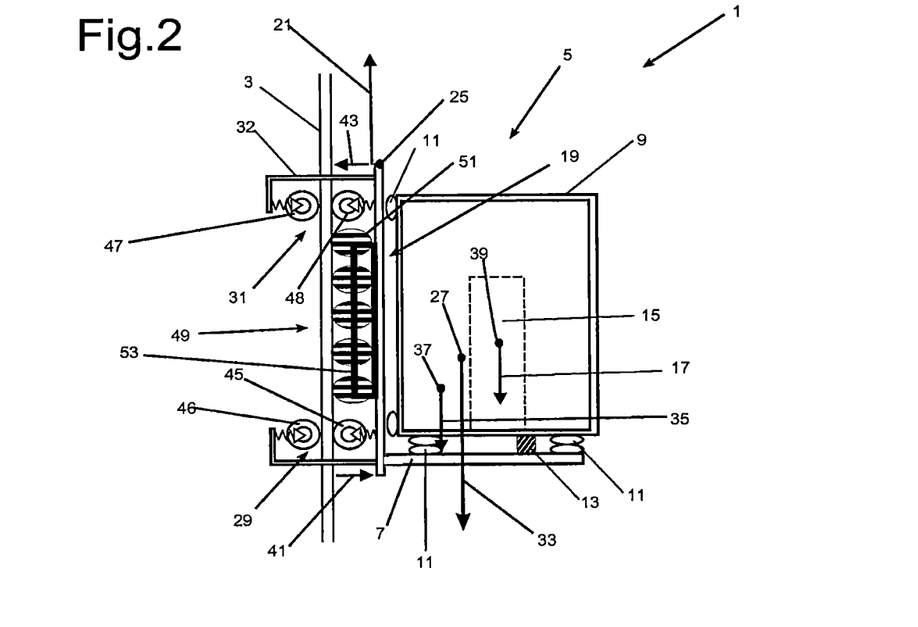
FIG. 2 a schematic view of a lift installation in the prior art

FIG. 2 shows a schematic representation of an alternative lift installation 1. In contrast to FIG. 1, the apparatus 19 for applying a retaining force 21 to the lift car is designed as a linear motor 49. The linear motor 49 comprises a stationary component 51, which extends along the guide rail 3, and a mobile component 53, which is connected to the lift car 5. With the aid of the linear motor 49, the lift car 5 is moved along the guide rail 3. Furthermore, the lift car 5 can be subjected to a retaining force 21 with the aid of the linear motor 45 in order to hold the lift car 5 in a stable position.

Figure 3:
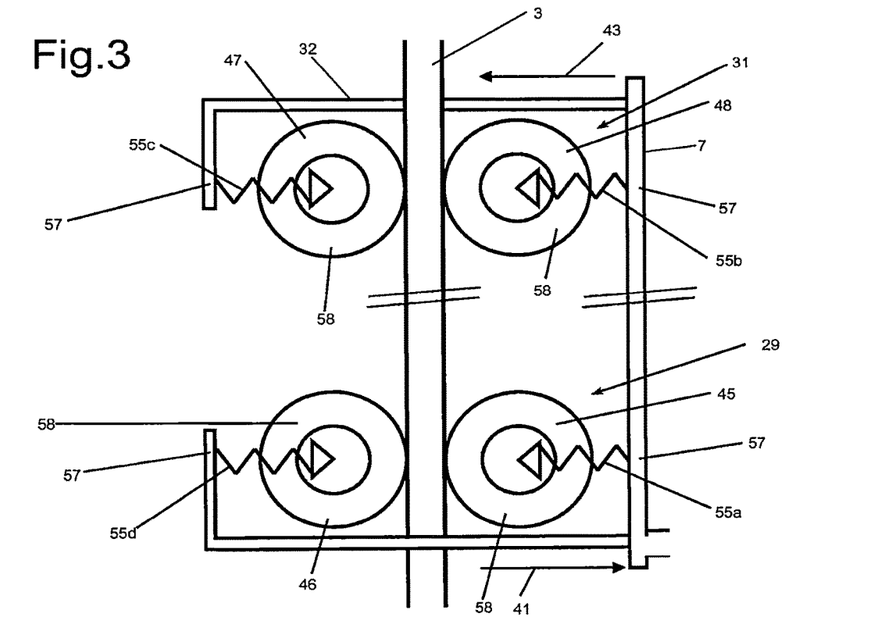
FIG. 3 an enlarged representation of a roller guidance in an ideal state

FIG. 3 shows an enlarged representation of the first and second pair of rollers 29, 31 from FIG. 1. The first pair of rollers 29 comprises a first roller 45 and a second roller 46. The second pair of rollers 31 comprises a first roller 47 and a second roller 48. Between the first and the second roller of the pair of rollers 29, 31 runs the guide rail 3.

All four rollers 45, 46, 47 and 48 are connected by an elastic connection element 55 to a mounting 57. FIG. 3 shows an idealized representation in which no retaining force and no weight are applied, so that no first torque is acting. Consequently, the compensating forces 41 and 43 are equal to zero and a condition of equilibrium is established, in which the same force is transmitted across all elastic connection elements 55, the forces on opposing rollers being oppositely directed. This force results from a pretension of the elastic connection elements 55. In this way, it is ensured that the rollers 45, 46, 47 and 48 lie securely against the guide rail 3.

All four rollers 45, 46, 47 and 48 have a material on their running surface which dampens noise and vibration. For example, this is an elastomer coating 58.

Figure 4:
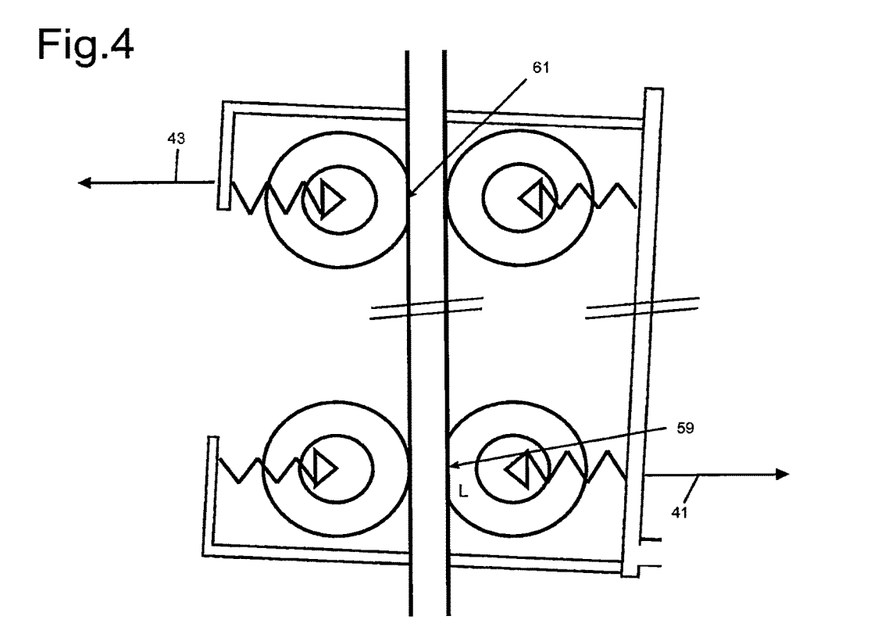
FIG. 4 an enlarged representation of a roller guidance in a real state

FIG. 4 shows the same configuration, wherein a retaining force and a weight is applied, so that a first torque is acting. Thus, the result is a tilting of the lift car until the elastic connection elements 55a and 55c are deformed so much that the elastic connection elements 55a and 55c generate enough compensating forces 41 and 43 to compensate for the first torque. The compensating forces 41 and 43 now act likewise on the contact regions 59 and 61. During the movement of the lift car 5, this loading is distributed equally over the entire running surface of the first rollers 45 and 47. When the lift car is at rest (e.g., during a stop or in a nighttime parked position), on the other hand, the loading is active for a lengthy time on the same contact region 59 or 61. This results in a plastic deformation of the rollers 45 and 47, especially if they have a soft, cushioning material on their running surface.

Figure 5:
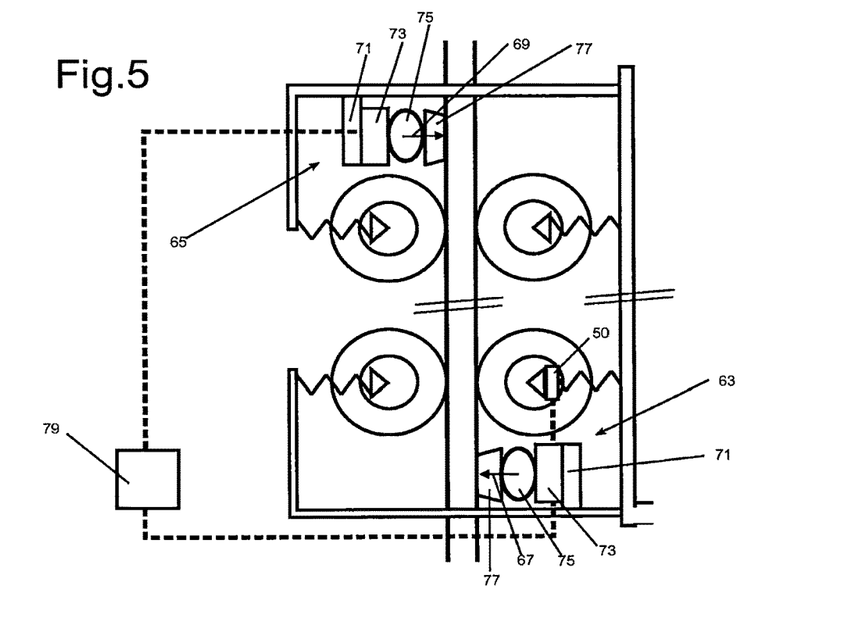
FIG. 5 an enlarged representation of a roller guidance according to the invention when the lift car is at rest FIG. 6 an enlarged representation of a roller guidance according to the invention when the lift car is moving FIG. 7 a detailed representation of the first compensating device FIG. 8 a representation of a second embodiment of a compensating device

FIG. 5 shows in an analogous representation a lift car 5 with a first compensating device 63 and a second compensating device 65. The first compensating device 63 applies to the guide rail 3 a force 67 and the second compensating device 65 applies to the guide rail 3 a force 69. Thus, the corresponding opposing forces act on the lift car 5, against which the compensating devices 63 and 69 are braced. The opposing forces generate a second torque. The second torque largely compensates the first torque in the present case, so that there is no tilting of the lift car 5 and the first roller 45 of the first pair of rollers 29 is largely relieved of loading. However, the pretension discussed in connection with FIG. 3 continues to act on the first roller 45. Accordingly, the first roller 47 of the second pair of rollers 31 is also largely relieved of loading thanks to the second compensating device 65.

The compensating devices 63 and 65 in the present case each comprise a support element 71, a control unit 73, an actuator 75 and a contact element 75. By the respective control unit 73, the two compensating devices 63 and 65 stand in signal communication with lift controls 79. The signal communication is indicated by the broken line.

When the lift car 5 comes to a stop, the lift controls 79 send a signal to the first compensating device 63 and the second compensating device 65. The signal is processed by the control units 73. These activate the two actuators 75, which thereupon extend by a travel. Thus, the actuator 75 of the first compensating device 63 generates a force 67 and the actuator 75 of the second compensating device 65 a force 69. The two forces 65 and 67 act across the contact elements 77 on the guide rail 3. Consequently, corresponding opposing forces act on the support elements 71. The two opposing forces together generate a second torque, which largely compensates for the first torque, so that the first roller 45 of the first pair of rollers 29 and the first roller 47 of the second pair of rollers 31 are largely relieved of loading.

In one variant, likewise represented, the first roller 45 of the first pair of rollers 29 comprises a sensor 50 for determining the force transmitted across the first roller 45. In this way, it can be directly measured whether a successful load relieving of the first roller 45 occurs. In addition to a pure checking, the sensor signal can also be used to regulate the force. For this, the first compensating device comprises a control unit 73, which stands in signal communication with the sensor 50 in order to generate from the signal of the sensor 50 a control signal for the compensating device 63. For example, the travel of the actuator 75 is increased until the first roller 45 is entirely relieved of loading. The signal communication is indicated in FIG. 5 by the broken line.

Figure 6:
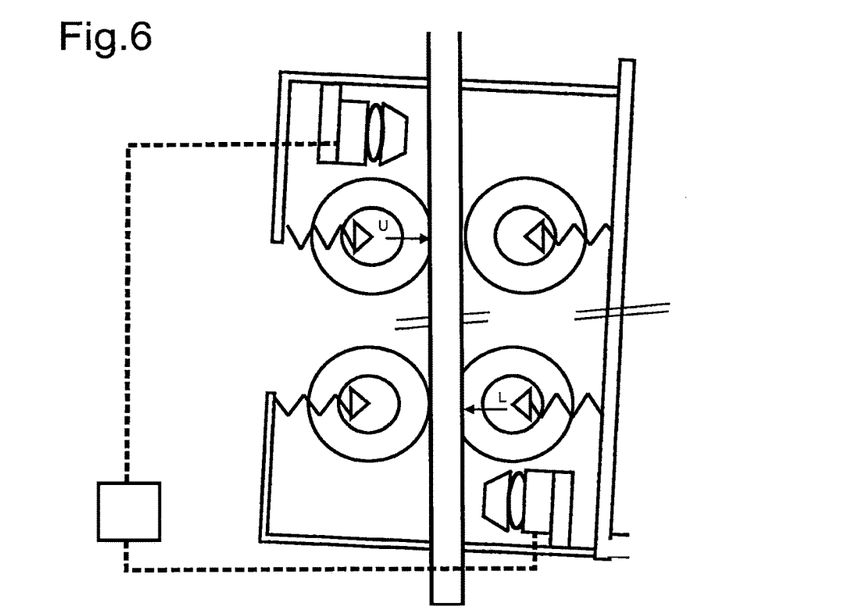

Before the lift car 5 continues in its movement, the lift controls 79 send a signal to the first compensating device 63 and the second compensating device 65. The signal is processed by the control units 73. These then contract by a travel until the guide rail 3 no longer has any contact with the contact elements 77. The forces are once again taken up across the first roller 45 of the first pair of rollers 29 and the first roller 47 of the second pair of rollers 31 as shown in FIG. 4. This configuration is shown in FIG. 6. In this state, the lift car 5 moves along the guide rail 3.

Figure 7:
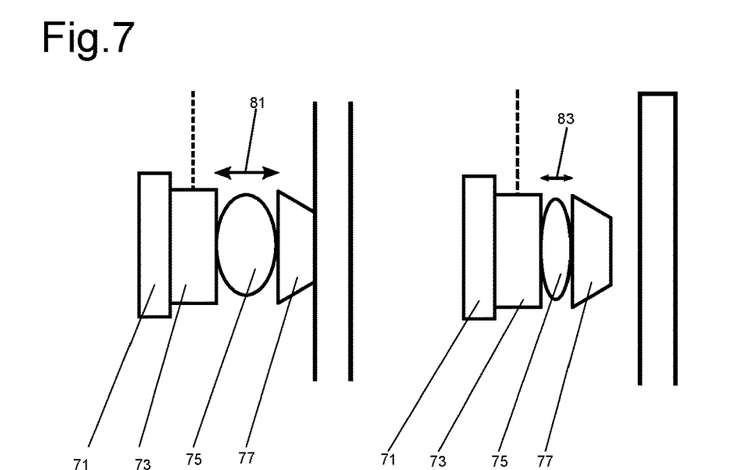

FIG. 7 shows an enlarged representation of the compensating unit 63 in the activated state (left) and in the deactivated state (right). In the activated state, the actuator 75 has a first extension 81 in the adjusting direction. In the deactivated state, the actuator 75 has a second extension 83 in the adjusting direction. The difference between the first extension 81 and second extension 83 is known as the travel of the actuator.

Figure 8:
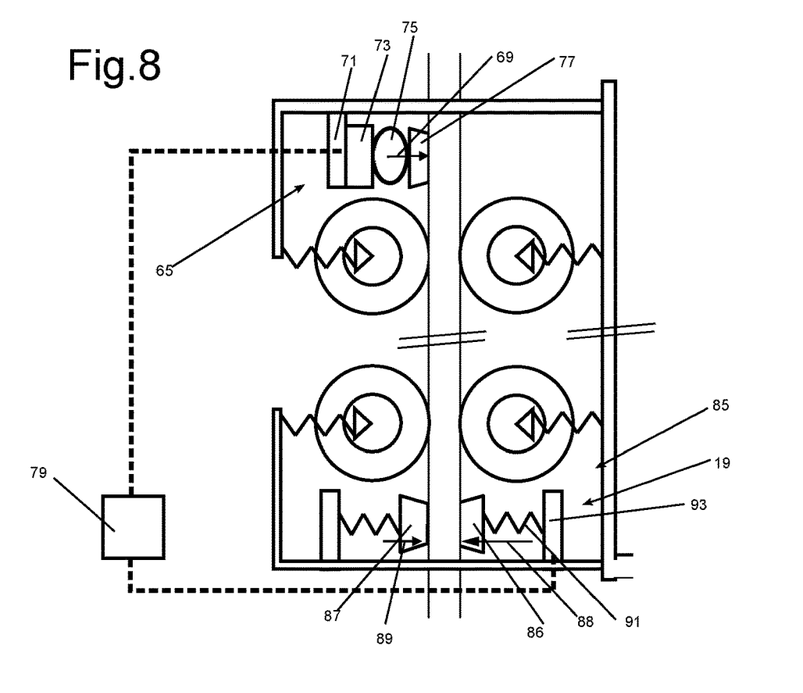

FIG. 8 shows another variant of the invention, where the apparatus 19 is designed as a parking brake 85. Furthermore, in this case the first compensating device 63 is integrated in the parking brake 85. The parking brake 85 comprises two brake shoes 86 and 87. The first brake shoe 86 is arranged on the same side of the guide rail as the first roller 45 of the first pair of rollers 29. The first brake shoe 86 is connected by an elastic element 91 to a frame 93. When the parking brake is active, the two brake shoes 86 and 87 exert opposing pressing forces 88 and 89 from opposite sides on the guide rail 3 at the same vertical position. The pressing force 88 is greater here than the pressing force 89, so that a resultant force remains, producing the second torque. In order for the compensating force in this configuration between guide rail 3 and load-bearing frame 71 to be substantially transmitted across the brake shoe 86 and not across the first roller 45, the elastic element 91 has greater stiffness than the elastic connection element 55a. The second compensating device 65 is similar in design to the preceding figures.

The parking brake 85 likewise stands in signal communication with the lift controls 79. The parking brake 85 can be used to brake the lift car from its movement or also only to hold the braked lift car in the position of rest.

LIST OF REFERENCE NUMBERS

Lift installation 1
Guide rail 3
Lift car 5
Load-bearing frame 7
Interior car 9
Damping elements 11
Weight sensor 13
Payload 15
Weight (payload) 17
Apparatus 19
Retaining force 21
Supporting rope 23
Point at which the retaining force takes effect 25
Center of gravity 27
First pair of rollers 29
Second pair of rollers 31
Roller housing 32
Weight (total) 33
Weight (empty lift car) 35
Center of gravity (empty lift car) 37
Center of gravity (payload) 39
Compensating forces 41
Compensating forces 43
First roller (of first pair of rollers) 45
Second roller (of first pair of rollers) 46
First roller (of second pair of rollers) 47
Second roller (of second pair of rollers) 48
Linear motor 49
Sensor 50
Stationary component 51
Mobile component 53
Elastic connection element 55a, b, c, d
Mounting 57
Elastomer coating 58
Load-deformed contact region 59
Load-deformed contact region 61
First compensating device 63
Second compensating device 65
Force 67
Force 69
Support element 71
Control unit 73
Actuator 75
Contact element 77
Lift controls 79
First extension 81
Second extension 83
Parking brake 85
Brake shoe 86
Brake shoe 87
Pressing force 88
Pressing force 89
Elastic element 91
Frame 93

The invention claimed is:

1. A lift installation having a lift car which can be moved along a guide rail, the lift installation comprising:
   a first pair of rollers comprising a first and second roller receiving the guide rail therebetween;
   a second pair of rollers comprising a first and second roller receiving the guide rail therebetween, wherein the lift installation has an apparatus for subjecting the lift car to a retaining force, wherein there is a horizontal offset between a point at which the retaining force takes effect and a center of gravity of the lift car, and therefore the lift car is subjected to a first torque; and
   a first compensating device so that, when the lift car is at rest, the guide rail is subjected to sufficient force to give rise to a second torque, which at least partially compensates for the first torque, so that the first roller of the first pair of rollers is at least partially relieved of loading when the lift car is at rest,
   wherein the first compensating device includes an actuator configured to move a contact element into and out of contact with the guide rail, wherein a travel distance of the actuator is selectively adjustable by a control unit such that the first compensating device is configured to selectively (i) relieve the entire loading on the first roller of the first pair of rollers, or (ii) partially relieve the loading on the first roller of the first pair of rollers.

2. The lift installation as claimed in claim 1 wherein the first roller of the first pair of rollers is joined by an elastic connection element to a roller housing mounting, the elastic connection element pre-tensioned to secure the first roller of the pair of rollers to the guide rail, and said partially relieving the load on the first roller of the first pair of rollers comprises reducing the load on the first roller of the first pair of rollers to 10% of the load when the first compensating device is not actuated.

3. The lift installation as claimed in claim 1, wherein the apparatus comprises a parking brake, in which the compensating device is integrated.

4. The lift installation as claimed in claim 3, wherein the parking brake comprises two brake shoes, and is configured when the parking brake is active to selectively apply opposing pressing forces from opposite sides against the same vertical position on the guide rail, wherein the two brake shoes act with different pressing forces on the guide rail, so that a resultant force remains to produce the second torque.

5. The lift installation as claimed in claim 4, wherein the first roller of the first pair of rollers is connected by an elastic connection element to a roller housing mounting, a first brake shoe of the two brake shoes is arranged on the same side of the guide rail as the first roller of the first pair of rollers, the first brake shoe is connected by an elastic element to a frame and the elastic element has greater stiffness than the elastic connection element.

6. The lift installation as claimed in claim 5, wherein the lift installation comprises lift controls and the compensating device is in signal communication with the controls.

7. The lift installation as claimed in claim 1, wherein the lift car comprises a load-bearing frame and an interior car, wherein between the interior car and the load-bearing frame there is arranged at least one weight sensor for determining the weight of the lift car.

8. The lift installation as claimed in claim 7, wherein the first compensating device comprises a control unit, which stands in signal communication with the weight sensor in order to generate from the signal of the weight sensor a control signal for the compensating device.

9. The lift installation as claimed in claim 8, wherein the first compensating device comprises a control unit, which stands in signal communication with the sensor in order to generate from the signal of the sensor a control signal for the compensating device.

10. The lift installation as claimed in claim 1, wherein the roller of the first pair of rollers comprises a sensor for determining the force transmitted across the first roller of the first pair of rollers to enable determining when the loading on the first roller of the first pair of rollers is relieved, wherein the sensor is in signal communication with the first compensating device.

11. The lift installation as claimed in claim 1, wherein the lift car comprises a second compensating device in order to apply a force to the guide rail when the lift car is at rest so that the second torque is further produced, which at least partially compensates for the first torque, so that at least the first roller of the second pair of rollers is at least partially relieved of loading when the lift car is at rest, wherein the first compensating device and the second compensating device have a vertical offset from each other, wherein the first and second compensating devices are arranged so that the forces which the compensating devices can apply to the guide rail are directed opposite each other.

12. A lift installation comprising:
a guide rail;
a lift car having a load bearing frame;
a roller housing coupled to the load bearing frame;
a first pair of rollers disposed within the roller housing and comprising first and second rollers receiving the guide rail therebetween;
a second pair of rollers disposed within the roller housing and comprising first and second rollers receiving the guide rail therebetween;
an elastic connection element individually coupling each of the first and second rollers of both the first and second pair of rollers to a mounting of the roller housing, each elastic connection element pre-tensioned to secure one of the first and second rollers of the first and second pair of rollers against the guide rail;
a first compensating device coupled to the roller housing and configured to selectively engage the guide rail to establish a first torque on the lift car to compensate for a second torque acting on the lift car when the lift car is at rest, such that loading on the first roller of the first pair of rollers is relieved;
a second compensating device coupled to the roller housing and configured to selectively engage the guide rail to further establish the first torque such that loading on the second roller of the second pair of rollers is relieved.

13. The lift installation of claim 12, wherein the first and second compensating devices each comprise:
a support element extending from the roller housing;
a control unit coupled to the support element between the support element and the guide rail, the control unit configured to selective actuate the associated first or second compensating device upon receipt of a signal from a lift control indicating the lift car has come to a stop; and
a contact element coupled to an actuator, wherein the control unit is configured to selectively extend the actuator such that the contact element contacts the guide rail to establish the first torque;
wherein the forces on the guide rail generated by first and second compensating devices are opposite to each other.

14. The lift installation of claim 13, wherein the first roller of the first pair of rollers includes a sensor for determining the force transmitted across the first roller of the first pair of rollers to facilitate determining when the loading on the first roller of the first pair of rollers is relieved, wherein the sensor is in signal communication with the control unit.

15. The lift installation of claim 14, further comprising an apparatus for subjecting the lift car to a retaining force to enable the lift car to be held in a rest position,
wherein the load bearing frame is generally L-shaped and includes a horizontally extending member and a vertically extending member, wherein the roller housing is coupled to the vertically extending member, and wherein the lift car further includes an interior car supported by the horizontally extending member,
wherein a first set of dampers is disposed between the lift car and the vertically extending member, and a second set of dampers is disposed between the lift car and the horizontally extending member.

16. The lift installation of claim 15, wherein the apparatus for subjecting the lift car to a retaining force comprises a supporting rope coupled to the lift car to apply the retaining force thereto, the supporting rope connecting the lift car across a traction sheave to a counterweight, such that the lift car has an off-center suspension.

17. The lift installation of claim 16, wherein the apparatus for subjecting the lift car to a retaining force comprises a linear motor disposed within the roller housing and having a stationary component extending along the guide rail, and a mobile component coupled to the lift car, wherein the linear motor is configured move the lift car along the guide rail.

18. The lift installation of claim 13, wherein a travel distance of the actuator is selectively adjustable by the control unit such that a magnitude of the second torque produced by the compensation devices is variable.

19. A lift installation comprising:
a guide rail;
a lift car movable along the guide rail;
a first pair of rollers comprising a first and second roller receiving the guide rail therebetween;
a second pair of rollers comprising a first and second roller receiving the guide rail therebetween;
an apparatus for subjecting the lift car to a retaining force, wherein there is a horizontal offset between a point at which the retaining force takes effect and a center of gravity of the lift car, and therefore the lift car is subjected to a first torque; and
a first compensating device having an actuator configured to move a contact element into selective contact with the guide rail, to thereby produce a second torque when the lift car is at rest, and at least partially relieve loading on the first roller of the first pair of rollers,
wherein a travel distance of the actuator is selectively adjustable by a control unit such that a magnitude of the second torque produced by the compensation device is variable.

20. The lift installation of claim 19, wherein the actuator is one of a hydraulic actuator or a pneumatic actuator.

* * * * *